US012611673B2

(12) United States Patent
Smith et al.

(10) Patent No.: US 12,611,673 B2
(45) Date of Patent: Apr. 28, 2026

(54) INTEGRATED CONTAINER ADAPTER FOR PHOTOACOUSTIC MICROSCOPY

(71) Applicants: Barbara S. Smith, Scottsdale, AZ (US); Christopher Miranda, Tempe, AZ (US); Ethan B. Marschall, Queen Creek, AZ (US)

(72) Inventors: Barbara S. Smith, Scottsdale, AZ (US); Christopher Miranda, Tempe, AZ (US); Ethan B. Marschall, Queen Creek, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 221 days.

(21) Appl. No.: 18/629,467

(22) Filed: Apr. 8, 2024

(65) Prior Publication Data

US 2024/0399374 A1 Dec. 5, 2024

Related U.S. Application Data

(63) Continuation of application No. 16/902,110, filed on Jun. 15, 2020, now Pat. No. 11,975,327.

(Continued)

(51) Int. Cl.
*B01L 3/00* (2006.01)
*G01N 21/17* (2006.01)

(52) U.S. Cl.
CPC .......... *B01L 3/508* (2013.01); *G01N 21/1702* (2013.01); *G01N 2021/1706* (2013.01)

(58) Field of Classification Search
CPC .............. B01L 3/508; B01L 2300/042; B01L 2300/046; B01L 2300/0609;
(Continued)

(56) References Cited

U.S. PATENT DOCUMENTS

2011/0025951 A1 2/2011 Jones
2014/0066743 A1 3/2014 Nakajima et al.
(Continued)

*Primary Examiner* — Steven S Paik
*Assistant Examiner* — Tae W Kim
(74) *Attorney, Agent, or Firm* — Michael Best & Friedrich LLP

(57) ABSTRACT

An adapter for a container that provides an integrated photoacoustic microscopy system that is capable of real time imaging of samples within the container. The adapter allows a researcher or investigator to evaluate a sample using the photoacoustic effect, with or without a microscope. The adapter comprises a support portion, a planar portion, and a tube. The support portion includes a channel formed therein, the channel including a first surface, a second surface opposite the first surface, and an intermediate surface positioned between the first surface and the second surface, the channel configured to receive the rim of the container such that the intermediate surface of the channel is positioned adjacent a top surface of the rim and the first surface and the second surface extend along opposite sides of the sidewall. The planar portion is coupled to the support portion and extends across the opening of the container. The tube is coupled to and extends from the planar portion, the tube defines a bore having an axis, the axis being oriented at an angle relative to the planar portion, the bore configured to receive a photoacoustic transducer for real time imaging of a sample within the container.

20 Claims, 3 Drawing Sheets

Related U.S. Application Data

(60) Provisional application No. 62/863,658, filed on Jun. 19, 2019.

(58) Field of Classification Search
CPC ........ B01L 2300/0654; G01N 21/1702; G01N 2021/1706; C12M 23/38; C12M 41/36; C12M 23/10
USPC ....................................................... 73/24.02
See application file for complete search history.

(56) References Cited

U.S. PATENT DOCUMENTS

| | | |
|---|---|---|
| 2017/0292935 A1 | 10/2017 | Ren et al. |
| 2021/0333530 A1 | 10/2021 | Kim et al. |

INTEGRATED CONTAINER ADAPTER FOR PHOTOACOUSTIC MICROSCOPY

CROSS-REFERENCE TO RELATED APPLICATIONS

This application is a continuation of U.S. patent application Ser. No. 16/902,110, filed on Jun. 15, 2020, which is a non-provisional of and claims the benefit of U.S. Provisional Patent Application No. 62/863,658, filed on Jun. 19, 2019, the entire contents of both of which are incorporated herein by reference.

BACKGROUND

Optical microscopy is a common tool used in laboratory settings, for use in qualitative and quantitative analysis of a sample (e.g., biologicals, chemicals, or material properties). Petri dishes are used to contain a sample to be analyzed.

The photoacoustic effect is the phenomenon of an acoustic wave being generated as a consequence of electromagnetic wave absorption. When non-ionizing laser pulses are delivered, some energy gets converted to heat, causing the thermoelastic expansion, and then the generation of an ultrasonic wave from the rapid pressure differential. This effect relies on the differential thermoelastic expansion of the tissue, allowing the ability to examine the tissue in what is known as photoacoustic imaging.

Photoacoustic imaging is an imaging modality which derives contrast from the differences in optical absorption of the sample being analyzed, which may result from cellular structure, chemical structure, biologicals and the like, combining the high contrast of optical imaging with the resolution and improved depth of ultrasound. This technique has promise in its ability to differentiate characteristics of living tissue as physiological changes may affect the optical properties of a structure. Some endogenous molecules providing contrast may include DNA, RNA, hemoglobin, water, and lipids. Further contrast is possible through various means, such as dyes or receptor-specific absorbers, with popular examples being fluorescent proteins and nanoparticles.

A typical photoacoustic imaging system is comprised of a pulse-energy source and an acoustic detector-multiple variations of this system exist. This has important and widespread application in areas ranging from cancer detection to brain mapping.

SUMMARY

Disclosed herein is a simple and low cost tool that provides a method of imaging a sample in a petri dish easily and quickly. The tool provides an integrated photoacoustic microscopy system that is capable of real time imaging for samples within a commercially available petri dish, which would allow the researcher or investigator to evaluate a sample using the photoacoustic effect, with or without a microscope.

This novel tool allows for aligned placement of a transducer and an optical fiber or microscope objective adjacent or atop a container of variable size and dimensions. This enables photoacoustic microscopy to be performed at the same time as optical or fluorescence microscopy when the dish is placed on the microscope stage. The transducer can be a single (focused or unfocused) item or an array. Additionally, the optical fiber can be aligned with the objective of the microscope in order to perform electrophysiology on cells or tissue samples. A variety of arrangements can be utilized to enable multimodal imaging and microscopy on biologicals, chemicals or materials for use across a variety of fields.

In one embodiment, the disclosure provides an adapter for a container. The container includes a bottom wall, a rim, a sidewall positioned between the bottom wall and the rim, and an opening defined by the rim. The adapter comprises a support portion, a planar portion, and a tube. The support portion includes a channel formed therein, the channel including a first surface, a second surface opposite the first surface, and an intermediate surface positioned between the first surface and the second surface, the channel configured to receive the rim of the container such that the intermediate surface of the channel is positioned adjacent a top surface of the rim and the first surface and the second surface extend along opposite sides of the sidewall. The planar portion is coupled to the support portion and extends across the opening of the container. The tube is coupled to and extends from the planar portion, the tube defines a bore having an axis, the axis being oriented at an angle relative to the planar portion, the bore configured to receive a photoacoustic transducer for real time imaging of a sample within the container.

In another embodiment, the disclosure provides an adapter for a petri dish. The petri dish includes a bottom wall, a rim, a sidewall positioned between the bottom wall and the rim, and an opening defined by the rim. The adapter comprises an arcuately-shaped support portion including a first side and a second side, and a channel formed within the support portion and extending between the first side and the second side, the channel configured to receive the rim of the petri dish. The adapter also includes a planar portion coupled to the support portion between the first side and the second side, the planar portion extending across an opening of the petri dish, and a tube coupled to the planar portion, the tube oriented at an angle relative to the planar portion and defining a bore, the bore configured to receive a photoacoustic transducer for real-time multi-modal imaging of a sample within the petri dish.

In still another embodiment, the disclosure provides an adapter for a petri dish. The petri dish includes a bottom wall, a rim, a sidewall positioned between the bottom wall and the rim, and an opening defined by the rim. The adapter comprises a support portion including a first side and a second side, and a channel formed within the support portion and extending at least partially between the first side and the second side, the channel including a first surface, a second surface opposite the first surface, and an intermediate surface positioned between the first surface and the second surface, the channel configured to receive the rim of the petri dish such that the intermediate surface of the channel is positioned adjacent a top surface of the rim and the first surface and the second surface extend along opposite sides of the rim. The adapter also includes a tube coupled to the support portion and oriented at an angle relative to the support portion, the tube defining a bore configured to receive a photoacoustic transducer, and a guide member extending from the tube, the guide member configured to align the photoacoustic transducer and an optical microscope to an imaging region of a sample in the petri dish for real-time photoacoustic microscopy imaging.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Terms of degree, such as "substantially," "about," "approximately," etc. are understood by those of ordinary skill to refer to reasonable ranges outside of the given value, for example, general tolerances associated with manufacturing, assembly, and use of the described aspects.

For the specification of numeric ranges herein, each intervening number there between with the same degree of precision is explicitly contemplated. For example, for the range of 6-9, the numbers 7 and 8 are contemplated in addition to 6 and 9, and for the range 6.0-7.0, the numbers 6.0, 6.1, 6.2, 6.3, 6.4, 6.5, 6.6, 6.7, 6.8, 6.9, and 7.0 are explicitly contemplated.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The term "about" as used herein as applied to one or more values of interest, refers to a value that is similar to a stated reference value. In certain aspects, the term "about" refers to a range of values that fall within 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Figure 1:
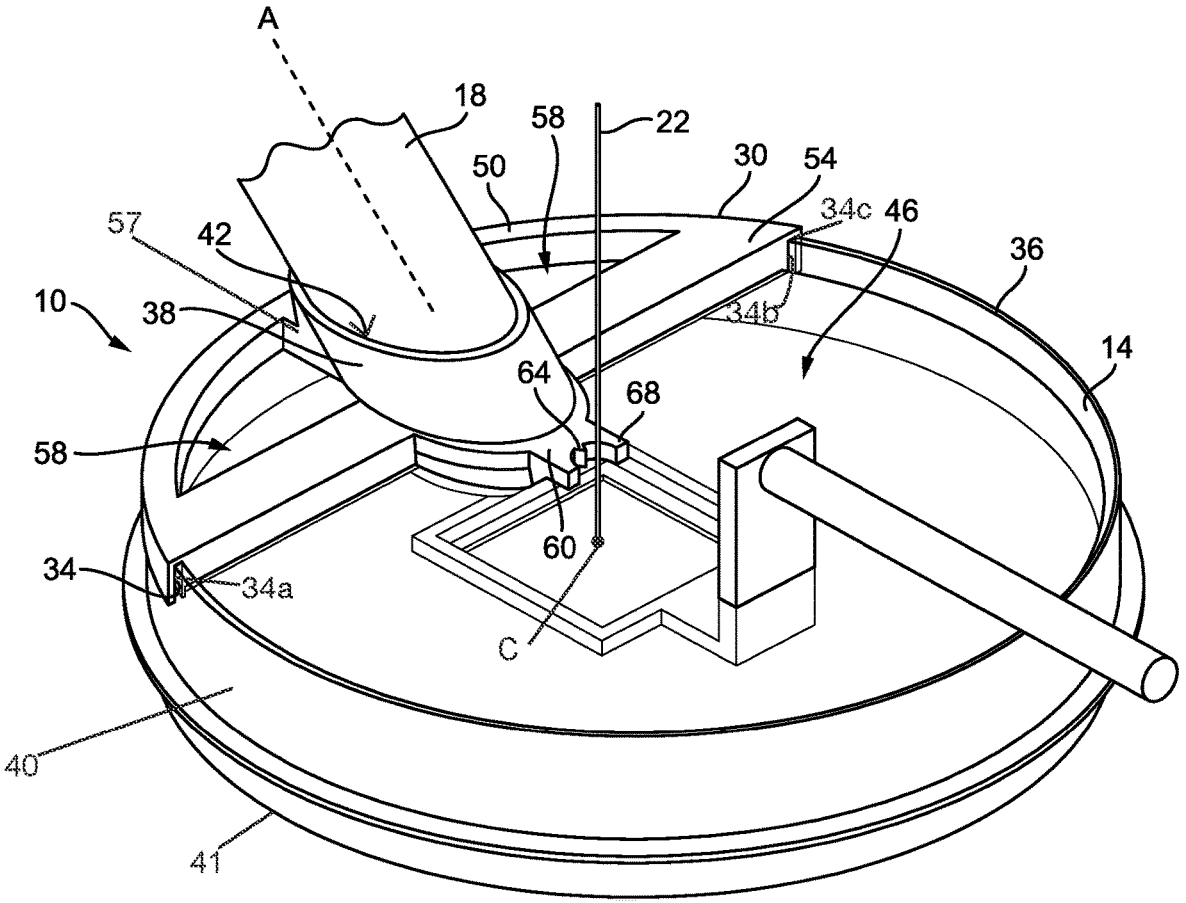
FIG. 1 illustrates a perspective view of an adapter for a container with a transducer positioned therein.
Figure 2:
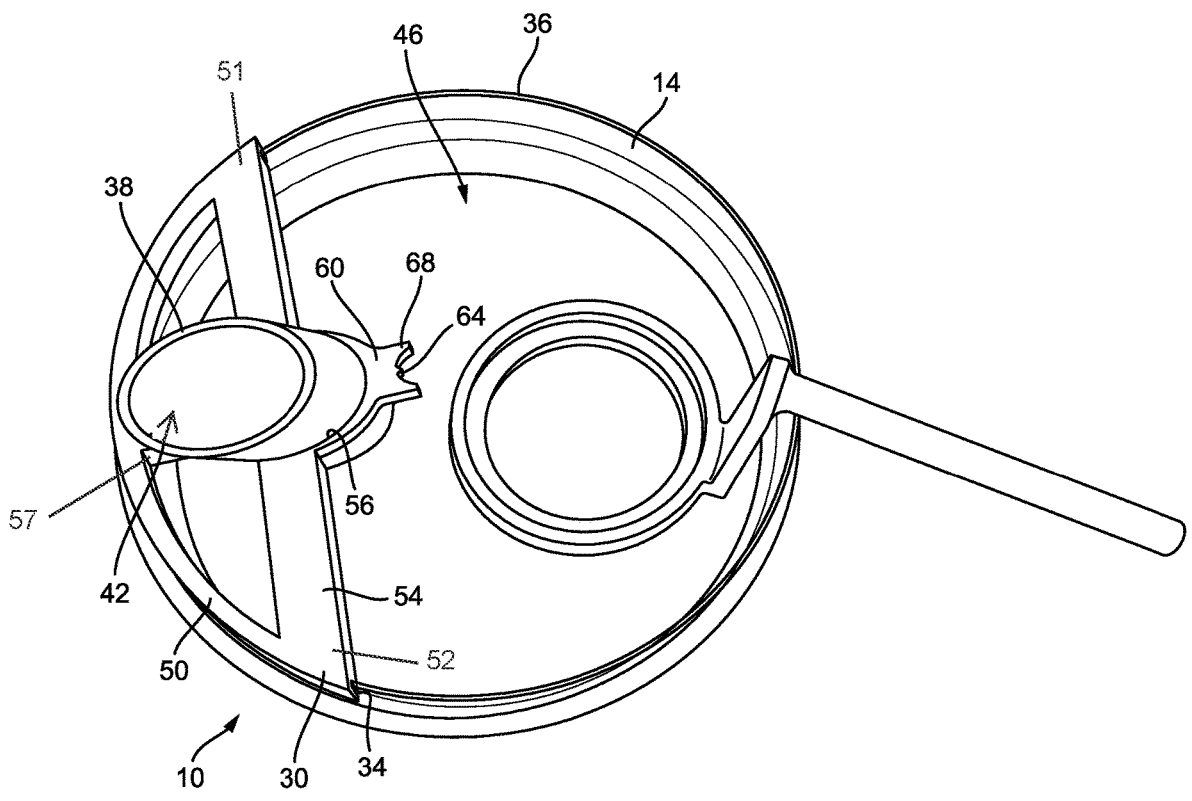
FIG. 2 illustrates another perspective view of an adapter for a container without a transducer positioned therein.
Figure 3:
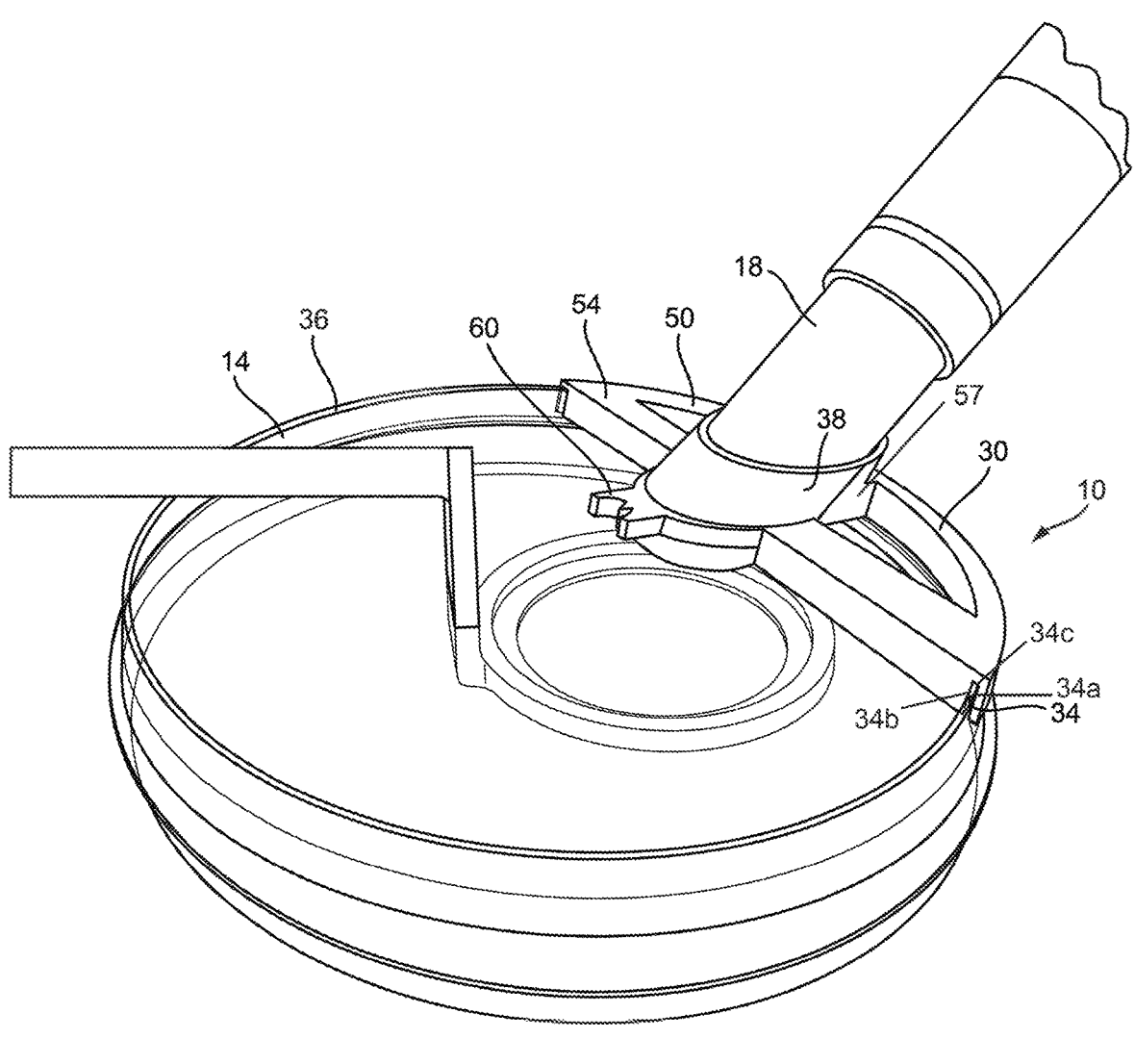
FIG. 3 illustrates another perspective view of an adapter for a container with a transducer positioned therein.

FIGS. 1-3 illustrate an adapter 10 that is removably positionable on and supported by a container 14. The adapter 10 is configured to fit securely on a portion of the container 14 for support above a sample in the container 14. The adapter 10 supports the angular placement and alignment of a transducer 18 relative to other imaging tools, such as an optical fiber 22 or an optical microscope. The adapter 10 can accommodate transducers having various sizes and dimensions. The adapter 10 provides a tool for multiple imaging modalities to simultaneously visualize a sample in the container. For example, the adapter 10 allows for overlapping foci or imaging region of an optical microscope and a photoacoustic transducer such that both imaging tools image or visualize the same or substantially the same portion of the sample in the container 14. Moreover, because the adapter 10 is configured to be supported on a container 14, it provides a photoacoustic microscopy system that is capable of real-time imaging of a sample within the container 14.

The container 14 includes a bottom wall 41 and a sidewall 40 extending from the bottom wall 41. The sidewall defines a rim 36. In the illustrated embodiment, the bottom wall 41 and the sidewalls are substantially circular, and the bottom wall 41 defines an imaging surface that is surrounded by the sidewall 40. In other embodiments, the container 14 may have any suitable shape. For example, the container 14 may include bottom walls and sidewalls that are rectangular, square, or polygonal. Additionally, the container 14 may be any suitable size.

The container 14 may include, for example, a petri dish or other surface culture dish. For example, a petri dish may be a 35 mm petri dish, a 60 mm petri dish, a 100 mm petri dish. The surface culture dish may be a flat bottom cell culture plate. The flat bottom cell culture plate may have 1 well, 6 wells, 12 wells, 24 wells, 48 wells, 96 wells, 384 wells, or any other number of wells.

With continued reference to FIGS. 1-3, the adapter 10 includes a base 30. As shown, in FIG. 1, the base 30 includes a support portion 50 and a planar portion 54. The support portion 50 includes a first end 51 and a second end 52. The support portion 50 also includes a channel 34 configured to receive the rim 36 of the container 14. The channel 34 may extend fully or partially between the first end 51 and the second end 52 of the support portion 50. The channel 34 includes a first surface 34a, a second surface 34b that is opposite the first surface 34a, and a top or intermediate surface 34c extending between the first and second surfaces 34a, 34b. When the adapter 10 is supported by the container 14 and the rim 36 is received in the channel 34, the first surface 34a is configured to be positioned adjacent a first or exterior surface of the sidewall 40, the second surface 34b is configured to be positioned adjacent a second or interior surface of the sidewall 40, and the intermediate surface 34c is positioned adjacent a top surface of the rim 36. In the illustrated embodiment, the support portion 50 is arcuately-shaped to be concentric with the sidewall 40 and rim 36 of the container 14. Similarly, the channel 34 is formed within and concentric with the support portion 50 to receive the rim 36 of the container 14.

The planar portion 54 extends between the first end 51 and the second end 52 of the support portion 50. That is, the planar portion 54 is formed with (or otherwise coupled to) and extends between opposite ends 51, 52 of the support portion 50. In this configuration, the planar portion 54 extends over an opening 46 of the container 14 and defines a plane that is oriented parallel to a plane defined by the rim 36 of the container 14 when the base 30 is coupled to the container 14. The planar portion 54 extends across the opening 46 but does not cross a center point C of the container 14. As illustrated, for example, in FIG. 1, the base 30 is positioned on a container 14, and the planar portion 54 does not cross over the center point C of the container 14.

The base 30 also includes a tube 38 that is oriented relative to the base 30 at an angle. In one construction, as illustrated, the tube 38 is connected to the planar portion 54 of the base 30. The tube 38 defines a bore 42 extending therethrough. The bore 42 continues through the planar portion 54 to accommodate a viewing range of the transducer 18 received within the tube 38.

The bore 42 defines an axis A that is oriented at an angle relative to the planar portion 54. The bore 42 includes a diameter, and in some embodiments, the diameter of the bore 42 may decrease from a first end of the tube 38 to a second end of the tube 38 (e.g., the first end of the tube 38 being further from the sample while the second end of the tube 38 being closer to the sample). In other embodiments, the diameter may remain constant along the length of the tube 38. The bore 42 is configured to receive the photoacoustic transducer 18 for real-time imaging of a sample within the container 14.

With reference to FIGS. 2-3, the planar portion 54 includes an aperture 56 that receives the tube 38, such that a portion of the tube 38 is positioned on both sides (e.g., a top side and a bottom side) of the planar portion 54. In some embodiments, a distal end of an immersion transducer 18 extends past the second end of the tube 38 such that it may be positioned in the container 14 (e.g., submerged within a fluid contained in the container 14). In some embodiments, a dry contact transducer 18 may be used. In such a case, the dry transducer 18 may be positioned above or adjacent to the sample and not submerged in the fluid.

The base 30 further includes a guide member 60. The guide member 60 may be integrally formed with or otherwise coupled to the base 30. In one construction, the guide member 60 is formed with (or otherwise coupled to) the planar portion 54. The guide member 60 extends from the planar portion 54 and toward the center point C of the container 14. As illustrated, the guide member extends forward of the tube 38 and is oriented parallel to the plane of the base 30. In other embodiments, the guide member 60 may be formed with the tube 68 and extend from the tube 68 toward the center point C of the container 14. As shown, the guide member 60 and the support portion 50 of the base 30 are positioned on opposite sides of the tube 38.

The guide member 60 includes an arcuately-shaped wall 68, and a projection 64 extending from the arcuately-shaped wall 64. The projection 64 is positioned centrally within the arcuately-shaped wall 64. The guide member 60 and projection 64 are configured to assist with alignment of the photoacoustic transducer 18 relative to another imaging modality, such as an optical fiber 22 or an objective of a microscope for concurrent imaging or visualization of the sample in the container 14.

As discussed above, the planar portion 54 includes an aperture 56. The aperture 56 is formed in the planar portion 54 and can extend partially into the guide member 60. The tube 38 may be positioned such that it is positioned on the planar portion 54 and the guide member 60. The tube 38 may be coupled to the base 30, and specifically the planar portion 54, by any suitable means. For example, the tube 38 may be coupled to the base 30, and specifically the planar portion 54 by fasteners, adhesive, a friction fit engagement, or a snap-fit engagement. In other embodiments, the tube 38 may be integrally formed (e.g., formed as one-piece) with the base 30, and specifically the planar portion 54 (and, in some embodiments also the guide member 60).

As illustrated, the base 30 is coupleable to a portion of a perimeter of the rim 36 of the container 14. That is, the support portion 50 does not extend around or along the entire rim 36 of the container 14 when coupled thereto. In other constructions, the base 30 can extend around or along the entire rim 36 of the container 14 when coupled thereto.

In some embodiments, the base 30 can include a cross-bar 57 that is coupled between the planar portion 54 and the support portion 50 to provide extra support for the tube 38 and added weight of the transducer 18. The cross-bar 57 may also be coupled to the tube 38. For example, as illustrated in the figures, the cross-bar 57 extends perpendicularly from the planar portion 54 and tube 38, and couples to the support portion 50. The tube 38 extends from the planar portion 54 and the cross-bar 57. In some embodiments, the planar portion 54 or cross-bar 57 may at least partially define the aperture 56. In some embodiments, the planar portion 54 or the cross-bar 57 may at least partially define the bore 42. That is, the planar portion 54 or cross-bar 57 may define at least a portion of the tube 38.

With reference to FIG. 1, the cross-bar 57 divides an opening 58 between the support portion 50 and the planar portion 54 to provide two openings 58. In other embodiments, the opening 58 may be absent, and in such configuration, the planar portion 54 extends to the support portion 50. In some embodiments, there may be several cross-bars 57 extending between the planar portion 54 and the support portion 50. In an example including several cross-bars, several openings 58 (e.g., two, three, or four, etc.) may be formed in the base 30.

In the illustrated embodiment shown in FIGS. 1-3, the tube 38 is oriented at an angle relative to the base 30. As discussed above, the tube 38 defines the axis A, which is oriented at an angle relative to the base 30. In some embodiments, the angle may be between 10° and 90°. In other embodiments, the angle may be between 15° and 60°. The angle may be 10°, 15°, 20°, 25°, 30°, 35°, 40°, 45°, 50°, 55°, 60°, 65°, 70°, 75°, 80°, 85°, 90°, or any value between these values. The adapter 10 may be fixed in position on the rim 36 during use, but the adapter 10 may also be moveable around the rim 36 to reposition the tube 38 and the guide member 60 and therefore the transducer 18 and other imaging components, such as the optical fiber 22 or microscope objectives.

In other embodiments, the base 30 may be secured to a sidewall 40 of the container 14 or a bottom wall 41 of the container 14 or a combination of the rim 36, the sidewall 40, and the bottom wall 41. For example, the channel 34 may have a height that is sufficient to receive a portion of each of the rim 36, the sidewall 40, and the bottom wall 41 of the container 14. That is, in some embodiments, the channel 34 may include a first surface coupled to the planar portion 54, a second surface positioned opposite the first wall, and an intermediate surface positioned between the first surface and the second surface. With such a configuration, the first surface is positionable adjacent the rim 36, the second surface is positionable adjacent the bottom wall 41, and the intermediate surface is positionable adjacent the exterior surface of the container 14. The base 30 may rest on the rim of the container 14 or be removably coupled to the container 14 with a friction fit or snap-fit engagement or other type of engagement.

In other embodiments, the support portion 50 of the base 30 may have other shapes to correspond with the walls of the respective container 14, e.g., petri dish or surface culture dish. For example, the support portion 50 may have a single straight wall that receives a complementary wall of a petri dish or surface culture dish or a plurality of walls that are coupled to and oriented at perpendicular or other angles relative to one another to accommodate rectangular or square-shaped polygonal shaped petri dishes or surface culture dishes.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

Various features and advantages of the adapter are set forth in the following claims.

What is claimed is:

1. An adapter for a container, the container including a bottom wall, a rim, a sidewall positioned between the bottom wall and the rim, and an opening defined by the rim, the adapter comprising:
   a support portion including a first end, a second end opposite the first end, a channel formed therein, the channel including a first surface, a second surface spaced apart from the first surface, and an intermediate surface positioned between the first surface and the second surface, the channel configured to receive the rim of the container such that the intermediate surface of the channel is positioned adjacent a top surface of the rim and the first surface and the second surface extend along opposite sides of the sidewall;
   a planar portion formed with the support portion and configured to extend partially across the opening of the container;
   an adapter opening positioned between the support portion and the planar portion, the adapter opening overlapping a portion of the opening of the container; and
   a tube coupled to and extending from the planar portion, the tube defining a bore having an axis, the axis being oriented at an angle relative to the planar portion, the bore configured to receive a photoacoustic transducer for real time imaging of a sample within the container.

2. The adapter of claim 1, wherein the angle is between 10° and 90°.

3. The adapter of claim 1, wherein the angle is between 15° and 60°.

4. The adapter of claim 1, wherein the container is circular, and further wherein the channel in the support portion is arcuately-shaped and is configured to receive an arcuate portion of the rim.

5. The adapter of claim 1, further comprising a cross-bar extending between the planar portion and the support portion.

6. The adapter of claim 5, wherein the adapter opening is a first adapter opening that is partially defined by the cross-bar, and further comprising second adapter opening positioned between the support portion and the adapter portion and partially defined by the cross-bar, the second adapter opening overlapping a portion of the opening of the container.

7. The adapter of claim 1, further comprising a guide member extending from the planar portion, and wherein the guide member and the support portion are positioned on opposite sides of the tube, the guide member configured to position the photoacoustic transducer relative to an optical fiber or an objective of a microscope.

8. The adapter of claim 1, further comprising a guide member extending from the planar portion, the guide member including an arcuately-shaped wall with a projection extending from the arcuately shaped wall, the projection configured to position the photoacoustic transducer relative to an optical fiber or an objective of a microscope.

9. The adapter of claim 1, further comprising a guide member extending from the tube, the guide member including a projection configured to position the photoacoustic transducer relative to an optical fiber or an objective of a microscope.

10. An adapter for a petri dish, the petri dish including a bottom wall, a rim, a sidewall positioned between the bottom wall and the rim, and an opening defined by the rim, the adapter comprising:
   an arcuately-shaped support portion including a first end and a second end, the arcuately shaped support portion defining a radius that is less than a radius of the container;
   a channel formed within the support portion and extending between the first end and the second end, the channel configured to receive the rim of the petri dish;
   a planar portion coupled to the support portion at both the first end and the second end; and
   a tube coupled to the planar portion, the tube oriented at an angle relative to the planar portion and defining a bore, the bore configured to receive a photoacoustic transducer for real-time multi-modal imaging of a sample within the petri dish.

11. The adapter of claim 10, further comprising an adapter opening positioned between the arcuately shaped support portion and the planar portion, the adapter opening overlapping a portion of the opening of the container.

12. The adapter of claim 10, further comprising a guide member extending from the planar portion or the tube, the support portion and the guide member positioned on opposite sides of the tube, the guide member configured to position the photoacoustic transducer relative to an optical fiber or an objective of a microscope.

13. The adapter of claim 10, wherein the angle is between 10° and 90°.

14. The adapter of claim 10, wherein the angle is between 15° and 60°.

15. An adapter for a petri dish, the petri dish including a bottom wall, a rim, a sidewall positioned between the bottom wall and the rim, and an opening defined by the rim, the adapter comprising:
   a planar portion including a first end and a second end opposite the first end, the planar portion configured to extend across the opening of the container at a non-central point relative to the opening of the container;
   a first channel formed within the planar portion adjacent the first end and a second channel formed within the planar portion adjacent the second end, each of the first channel and the second channel including a first surface, a second surface spaced apart from the first surface, and an intermediate surface positioned between the first surface and the second surface, each of the first channel and the second channel configured to receive the rim of the petri dish such that the intermediate surface of each of the first channel and the second channel is positioned adjacent a top surface of the rim and the first surface and the second surface of each of the first channel and the second channel extends along opposite sides of the rim;
   a tube coupled to and extending from the planar portion, the tube defining a bore having an axis, the axis being oriented at an angle relative to the planar portion, the bore configured to receive a photoacoustic transducer for real time imaging of a sample within the container; and
   a guide member extending from the tube, the guide member configured to position the photoacoustic transducer and an optical microscope relative to an imaging region of a sample in the petri dish for real-time photoacoustic microscopy imaging.

16. The adapter of claim 15, wherein the angle is between 10° and 90°.

17. The adapter of claim 15, wherein the angle is between 15° and 60°.

18. The adapter of claim 15, further comprising a cross-bar extending from the planar portion toward the rim of the container.

19. The adapter of claim 15, wherein the planar portion includes an aperture for the photoacoustic transducer to image the sample.

20. The adapter of claim 15, wherein the guide member includes a projection configured to position the photoacoustic transducer relative to an optical fiber or an objective of a microscope.

\* \* \* \* \*